(12) United States Patent
Lillejordet

(10) Patent No.: US 8,511,328 B2
(45) Date of Patent: Aug. 20, 2013

(54) PLUGGED HOT TAP TEE

(75) Inventor: Per Lillejordet, Bjørnemyr (NO)

(73) Assignee: Apply Nemo AS, Lysaker (NO)

( * ) Notice: Subject to any disclaimer, the term of this patent is extended or adjusted under 35 U.S.C. 154(b) by 22 days.

(21) Appl. No.: 13/121,141

(22) PCT Filed: Sep. 23, 2009

(86) PCT No.: PCT/NO2009/000330
§ 371 (c)(1),
(2), (4) Date: Apr. 19, 2011

(87) PCT Pub. No.: WO2010/036124
PCT Pub. Date: Apr. 1, 2010

(65) Prior Publication Data
US 2011/0187096 A1    Aug. 4, 2011

(30) Foreign Application Priority Data
Sep. 25, 2008 (NO) .................................. 20084079

(51) Int. Cl.
*F16L 55/00* (2006.01)
*F16L 39/00* (2006.01)

(52) U.S. Cl.
USPC ..... 137/15.12; 137/317; 137/323; 137/68.19; 137/68.27; 137/315.41; 285/39; 285/133.21; 138/94

(58) Field of Classification Search
USPC ................... 137/317, 318, 323, 15.12, 15.13, 137/68.19, 68.27, 68.3, 315.41, 315.42; 285/133.21, 133.4, 197, 55; 138/89, 92, 138/94
See application file for complete search history.

(56) References Cited

U.S. PATENT DOCUMENTS

| | | | | |
|---|---|---|---|---|
| 3,826,461 | A | * | 7/1974 | Summerfield et al. ............. 251/7 |
| 5,127,433 | A | * | 7/1992 | Argyle et al. .................. 137/559 |
| 5,904,377 | A | * | 5/1999 | Throup ............................ 138/89 |
| 6,648,562 | B1 | | 11/2003 | Calkins et al. |
| 6,691,733 | B1 | | 2/2004 | Morris |

* cited by examiner

*Primary Examiner* — Kevin Lee
(74) *Attorney, Agent, or Firm* — GableGotwals

(57) ABSTRACT

The invention is directed toward a T-pipe designed for transfer of high pressure fluids through the main run and where the branch run is left in a standby position for possible use in the future. The opening, or outlet, of the branch run is sealed by a material continuous with the main run. An opening and fluid flow in the branch run while the main run is in production and remains under full pressure, is to be provided. The sealing includes a metal membrane which is in contact with the fluid flowing in the main run. The metal membrane is thinner than the wall thickness of the T-pipe and is supported by a plug inserted in the branch run.

9 Claims, 7 Drawing Sheets

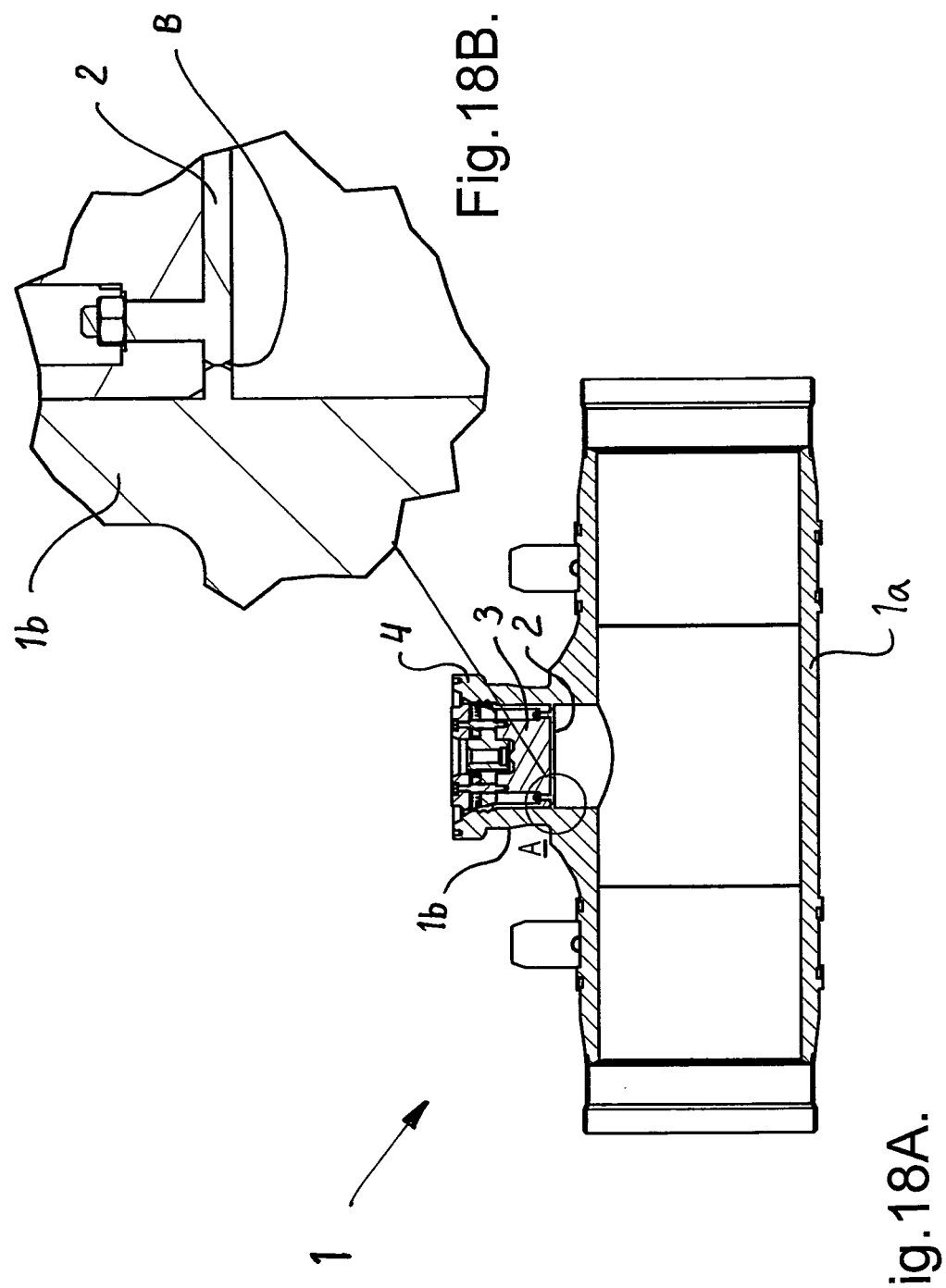

PLUGGED HOT TAP TEE

CROSS-REFERENCE TO RELATED APPLICATIONS

This application is the United States National Phase of PCT Patent Application No. NO2009/000330 filed on 23 Sep. 2009, which was published in English on 1 Apr. 2010 under Publication No. WO 2010/036124 A1, which claims priority to Norwegian Patent Application No. 2008 4079 filed 25 Sep. 2008, both of which are incorporated herein by reference.

The present invention relates to a T-pipe designed for transfer of fluids under high pressure through a main passage thereof, where a branch pipe thereof remains in standby position for possible future use, said branch pipe being sealed off in its opening by a material which is continuous with the main passage, and where a possibility to create an opening and fluid flow in the branch pipe is present while the main passage is in production and remains under full pressure.

The invention also relates to a tool for opening up a branch pipe of a T-pipe as defined above.

Further, the invention relates to a method for controlled opening of the branch pipe of a T-pipe which transfers fluid under high pressure through the main passage, where the branch pipe is sealed off in its opening by a material that is continuous with the main passage and has, until opening thereof, remained in standby position for possible future use, where an opening and fluid flow in the branch pipe is created while the main passage is under production and remains under full pressure, and the seal comprises a thinner metal diaphragm which is in contact with the fluid flowing through the main passage and the diaphragm is supported by a plug inserted in the branch pipe, where the first step of an opening operation is that a valve assembly is mounted to the branch pipe, the second step is that a tool is mounted on the valve assembly, the valve is being opened and the cavity of the valve is pressurized such that the pressure differential between the pipe and said cavity is balanced.

T-pipes of this nature are often welded into the pipelines deployed on the seabed. They are primarily designed to be used as future connecting points for branched off pipelines. One example of such future connection is a new well being drilled and developed in the same area such that the connection to existing pipeline is possible. In order to be able to make engagement and connection through the pipeline under full production, such T-pipes are installed into the pipeline at regular intervals.

Pipelines of this type often have a nominal diameter of 25-45" and operates with pressures up to 350 bar and even more. The branch pipelines are often 6-16" and operate at the same pressure when put into production.

The most common today is that such T-pipes are manufactured with a blind bore in the branch pipe projecting from the main passage. The blind bore is formed in that the "bottom" of the passage adjacent to the main passage is cast continuous with the T-pipe and has the same thickness as the wall of the main passage. This "bottom" constitutes a plate which is defined by the internal diameter of the branch pipe.

When the T-pipe is to be used and connection of a branched off pipeline is to be made, one has to cut through the plate by means of a tapping drill. This must be possible to perform while the pipeline is in operation and at full pressure, and is thus called "hot tapping" by the persons of this particular art. Before the cutting, the plate has a capacity to withstand the internal pressure of the main passage.

However, it has been proven that such operations are really complex and are associated with some risk since this is an underwater operation. The task to lower and simultaneously rotate the cutting tool within the pressurized cavity is difficult and provides a higher risk for mistake as a consequence. A risk that the cut out pipeline piece, i.e. the plate, drops into the main passage and follows the main production flow to the destination site exists, with the danger of damage to the equipment.

The tapping drill or the tapping saw to be used is also a hazard in itself if entire tooth breaks off from the saw blade. Naturally, during the sawing process some metal chips of various seize will be produced which also can provide damage and problems.

If some of the relatively complex sawing tool fail halfway of the tapping operation, this may entail that reversal of the operation is impossible, because the tool is stuck within or is not able to be elevated from the opening of the T branch of the pipeline. Such a situation may require full shut down of the main pipe and accordingly result in large economical consequences.

In any event, a "hot tap" T is provided with grooves and gasket surfaces in order to enable installation of a plug. It is considered to be an advantage that only one and the same tool is necessary to open/close the T. Traditionally one will need two types of tools; one hot tapping saw tool and one plug tool. By the new concept one is only dependent of the plug tool. This also reduces the risk for errors of the entire system.

According to the present invention a T-pipe of the introductory said kind is provided, which is distinguished in that the sealing includes a metal diaphragm which is in contact with the fluid flowing in the main passage, which metal diaphragm is thinner than the wall thickness of the T-pipe and is supported by a plug inserted in the branch pipe.

In this way a very well controlled removal of the metal diaphragm is achieved when a branch pipe is to be opened up from the T-pipe. This thin walled metal diaphragm in combination with a support plug replaces the previously described plate.

Preferably the metal diaphragm can have a thickness in the order of magnitude from 1/20 to 1/2 of the wall thickness of the T-pipe.

Preferably the metal diaphragm includes a rupture nick which is activated when the plug is pulled out.

The metal diaphragm can be loosely secured to the plug and is pulled therewith when the plug is pulled out.

Further, the plug may include internal activating means that can be manipulated by a tool.

In turn the activating means can include a conical mandrel body which is able to expand a locking ring.

According to the present invention, also a tool for opening up of a branch pipe of a T-pipe piece as defined in claims 1-3 is provided. This opening up is to take place totally controlled under full production pressure and fluid flow. The tool is being used together with a valve assembly that is firstly mounted in a sealing way to the branch pipe. The tool has coupling means in its lower end for engagement with the plug. This can be a bayonet coupling, threads or snapping connecting means.

According to the present invention, also a method of the introductory said kind is provided which is distinguished in that the tool is a plug tool which is lowered through the valve assembly and establishes a mechanical connection with the plug, that the plug tool is retrieved together with the plug and metal diaphragm as the metal diaphragm is torn loose from the T-pipe, that the plug tool, plug and diaphragm are parked within the plug module, that the valve assembly is closed and isolates the pipe from the environments and the plug module is disconnected from the valve assembly and removed, said valve assembly now stands ready for connection of a pipe.

Preferably the metal diaphragm is torn loose from the T-pipe along a prefabricated nick.

Other and further objects, features and advantages will appear from the following description of preferred embodiments of the invention, which are given for the purpose of description, and given in context with the appended drawings where:

Figure 4:
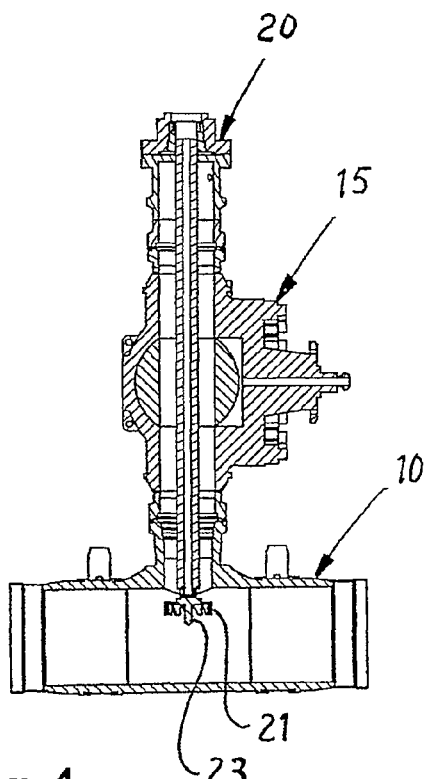
Figure 5:
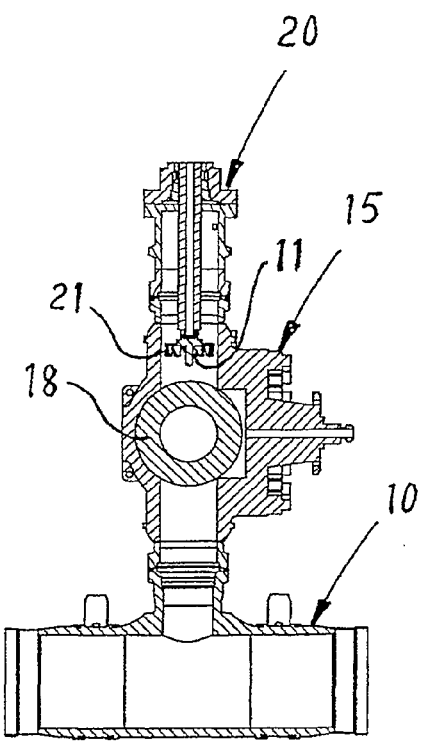
Figure 6:
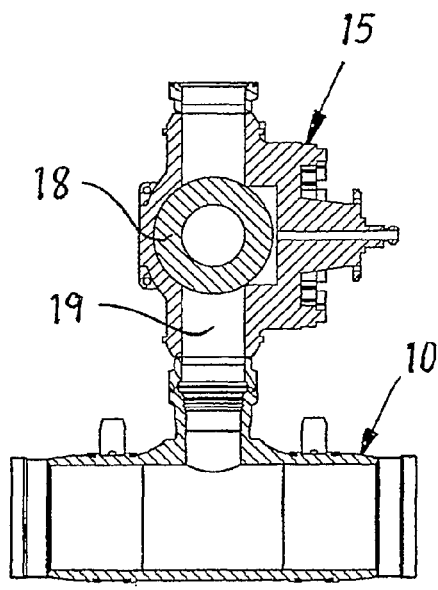
Figure 7:
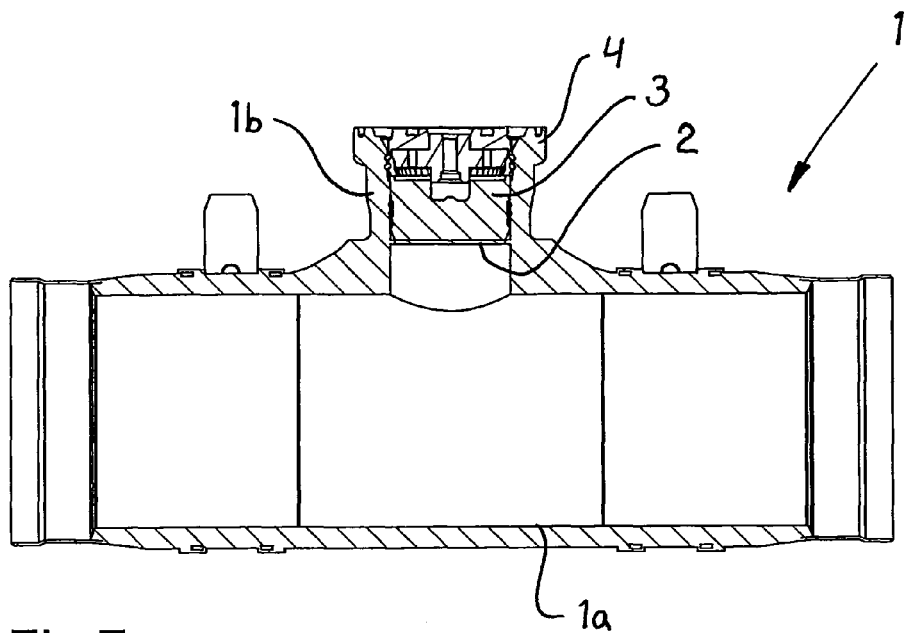
Figure 8:
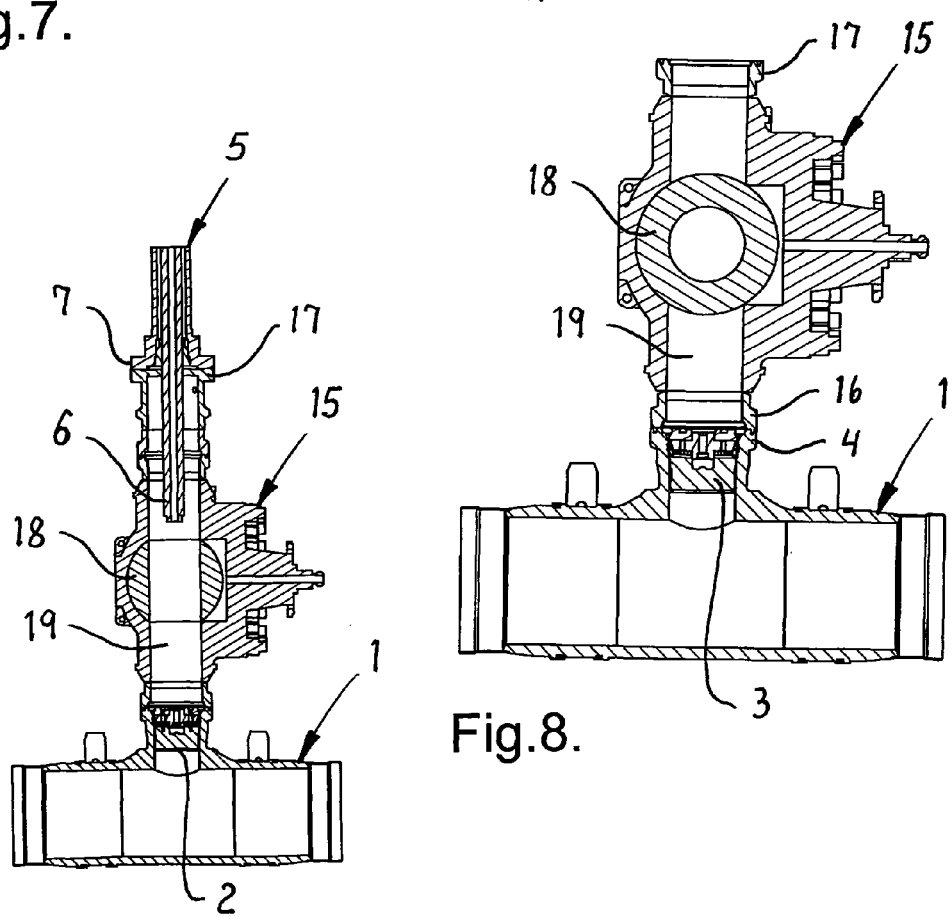
Figure 9:
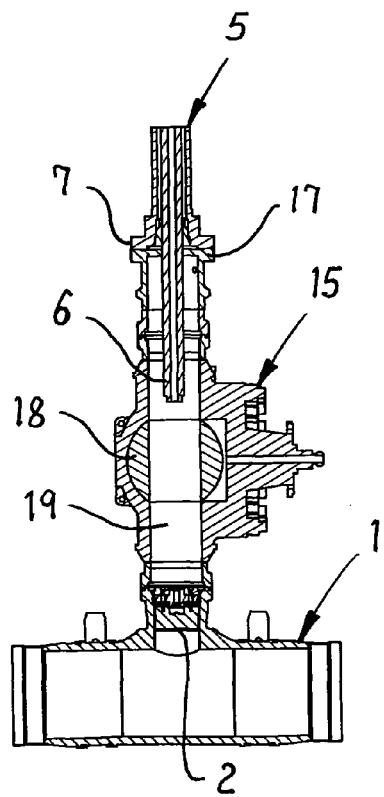
Figure 10:
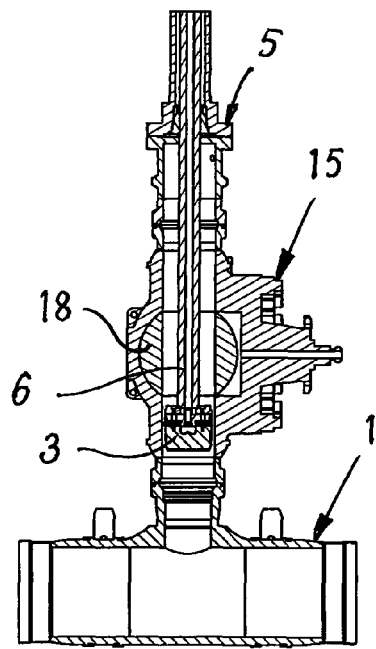
Figure 11:
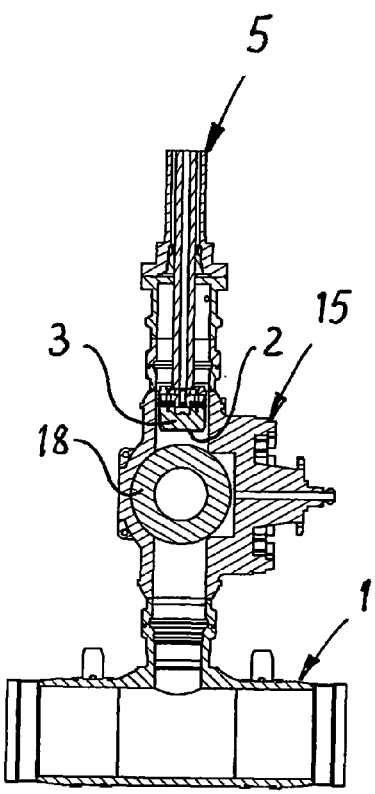
Figure 12:
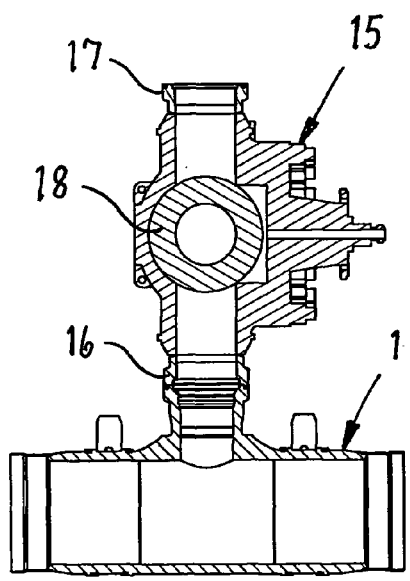
Figure 13:
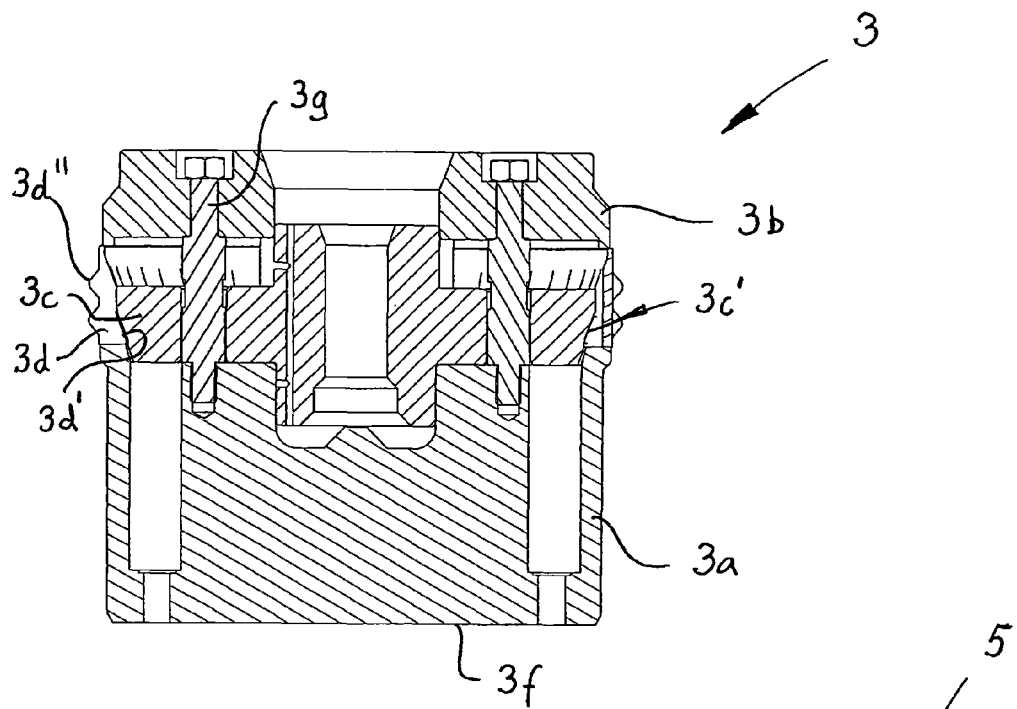
Figure 14:
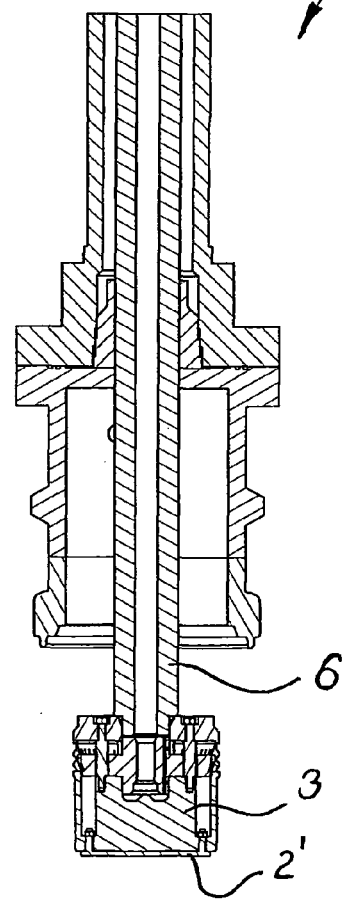
Figure 15:
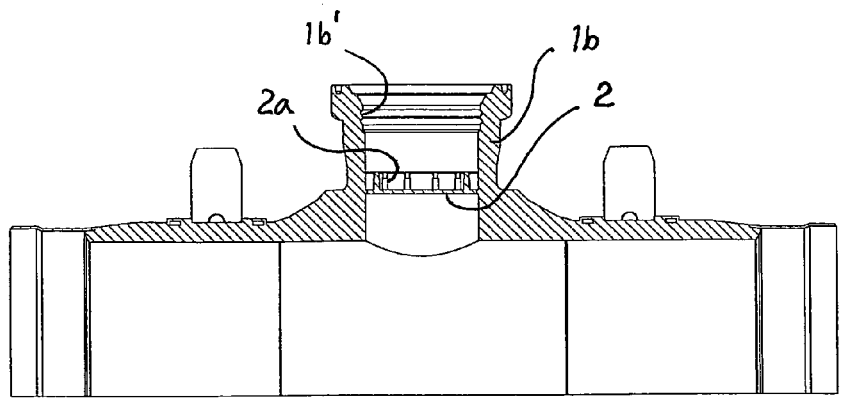
Figure 16:
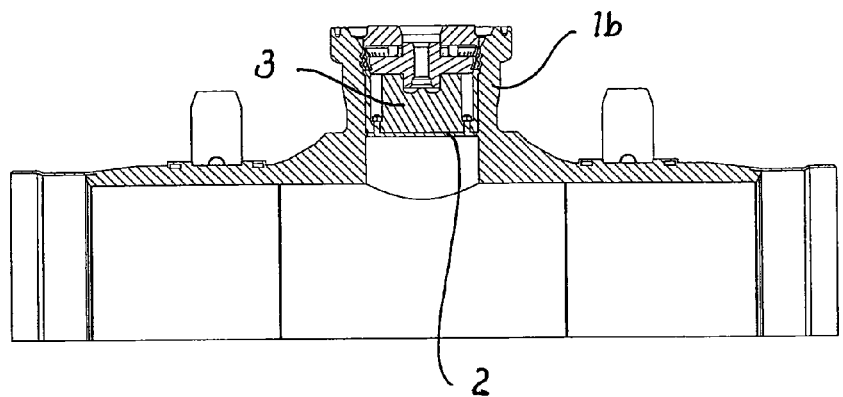
Figure 17:
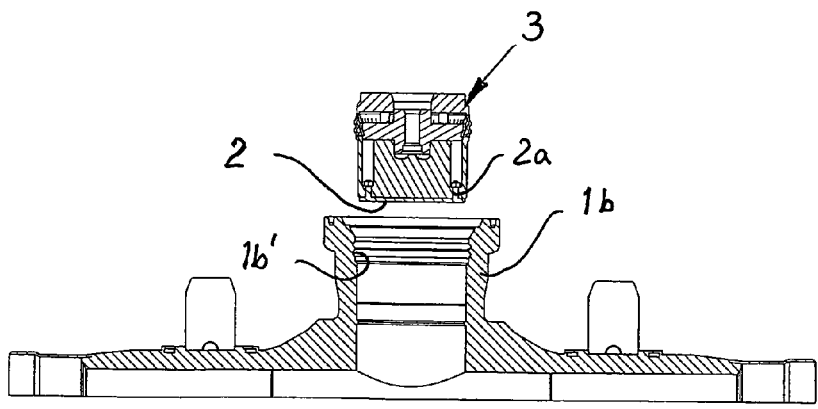

FIG. 4 shows the tool in form of a hot tapping saw in action for cutting through the plate, FIG. 5 shows the tool in retrieved position carrying the plate piece therewith, FIG. 6 again shows the T-pipe piece and the ball valve ready for mounting of a branch pipe, FIG. 7 shows the new T-pipe piece according to the invention, FIG. 8 shows a traditional ball valve mounted to the new T-pipe piece, FIG. 9 shows a modified tool mounted on the traditional ball valve according to FIG. 8, FIG. 10 shows the modified tool in the form of a retrieving tool in action for retrieving of a support plug and metal diaphragm, FIG. 11 shows the modified tool in retrieved position carrying the plug and metal diaphragm therewith, FIG. 12 shows again the new T-pipe piece and traditional ball valve ready for mounting of a branch pipe, FIG. 13 shows the support plug and its construction in closer detail, FIG. 14 shows the modified tool according to the invention, FIG. 15 shows an embodiment of a metal diaphragm before the plug is installed, FIG. 16 shows the same as FIG. 15 with the plug installed, FIG. 17 shows the plug and the diaphragm loosened from the T-pipe piece, and FIGS. 18A and 18B shows another variant of the invention.

Figure 1:
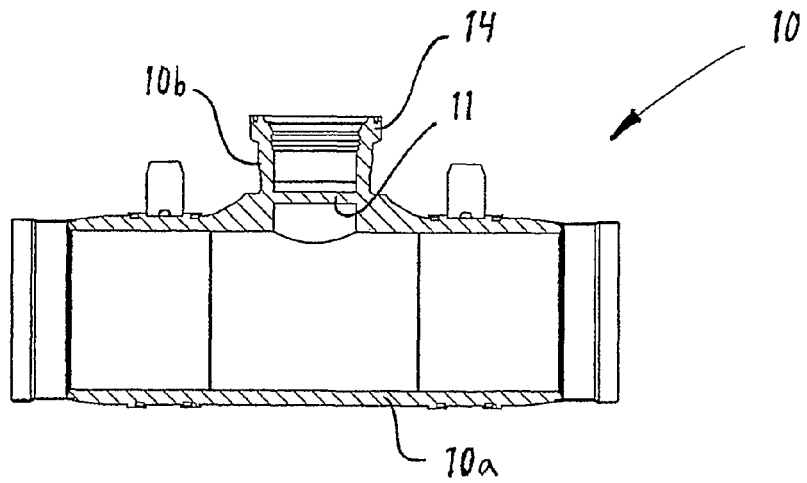
FIG. 1 shows a traditional T-pipe piece.

The traditional way to perform a "hot tap" operation will now be described with reference to the FIGS. 1-6. FIG. 1 shows a traditional T-pipe piece 10 which is prepared to be deployed on the seabed together with a pipeline (not shown) during a regular pipe laying operation. As previously mentioned, pipelines of this nature have a nominal diameter of 25-45" and operates with pressures up to 350 bar and more when they are in operation during production. The branched off pipelines are normally 6-16" and operates with the same pressure when they are set to work.

The T-pipe piece 10 is prepared for said "hot tapping" as a thick walled steel plate 11 forms a "bottom" in the branch off 10b from the T-pipe piece 10 and thus creates both a fluid barrier and a pressure barrier against the main passage 10a. Typical thickness of the plate 11 will be 50 mm under those conditions introductorily described. This plate 11 forms an adequate barrier against the environment.

Further, the top of the branch pipe 10b of the T-pipe piece 10 is arranged with a flange 14 and is adapted to be able to make a possible mechanical connection once in the future. Normally a clamp connector will be used to make up such a mechanical connection. In the meantime the connecting point will be protected by a cap or cover (not shown)

Figure 2:
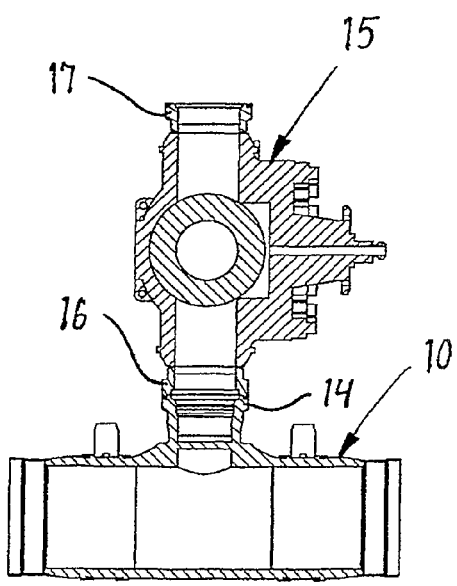
FIG. 2 shows a traditional ball valve mounted to the traditional T-pipe piece.

When the T-pipe piece 10 is to be used a ball valve is installed on top of the branch pipe 10b of the T-pipe piece 10 as shown in FIG. 2. As a common name, the connector, the ball valve and a supporting frame for both parts is called a valve module 15. At the lower end of the valve module a flange 16 is arranged that correspond with the flange 14 of the branch pipe 10b. The connection takes place by means of a mechanical connector (not shown) over the flanges 14, 16, such as the mentioned clamp connector. Also the top of the valve module 15 has a connector flange 17 and, in the same way as the T-pipe piece 10, is adapted to a mechanical connector (not shown) which acts over connector flanges. Also here, the mechanical connector can be a clamp connector.

Figure 3:
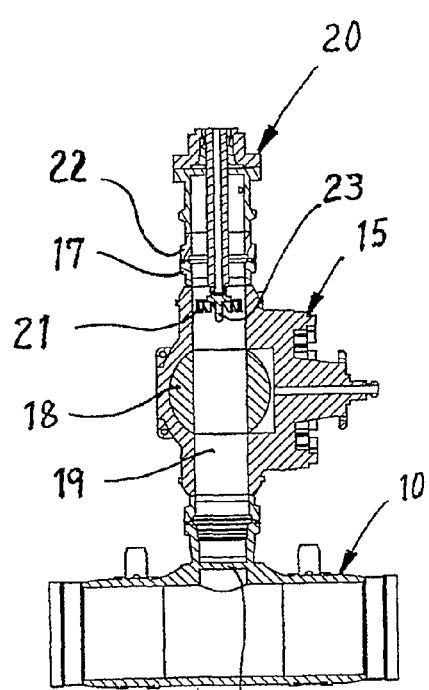
FIG. 3 shows a traditional tool mounted to the traditional ball valve.

On top of the valve module 15 a tool assembly 20 is installed as shown in FIG. 3. The tool assembly 20 includes a hot tap saw 21 designed to cut through the thick steel plate 11. The tool assembly 20 is mounted to the ball valve module 15 by means of another mechanical connector acting over a lower flange 22 of the tool assembly and the flange 17 of the valve module 15.

When a cutting through operation is to take place, the ball valve 18 is firstly opened. Then the cavity 19 of the ball valve module 15 and the sawing tool 20 is pressurized such that the pressure differential between the pipeline and the cavity 19 is balanced.

Then the hot tap saw 21 is lowered through the ball valve 18 in a direction towards the steel plate 11 at the bottom of the branch pipe 10a of the T-pipe piece 10 as shown in FIG. 4. Further, the hot tap saw 21 is provided with a centre bit 23 having barbs arranged thereon. When the steel plate 11 is through drilled the drilled out part of the steel plate 11 will be hanging in the centre bit 23.

After that the hole is ready drilled the hole saw 21 is pulled upwards through the ball valve 18 while the cut out steel plate 11 is securely hanging thereto and is brought along. See FIG. 5. Thereafter the ball valve 18 is closed which in turn isolates the pipeline from the environment. Then the entire tool 20 is disconnected from the ball valve module 15 and is retrieved to the surface. See FIG. 6. The T-pipe piece 10 is now ready for connection of a new branched off pipeline (not shown).

The new way to perform a "hot tapping" on, according to the invention, will now be described with reference to the FIGS. 7-12. Those parts, components or modules that are the same in the FIGS. 7-12 and 1-6, have the same reference numbers. FIG. 7 shows the new T-pipe piece 1 that is to be deployed together with the pipeline (not shown) during a regular pipe laying operation. As previously mentioned, pipelines of this nature often have a nominal diameter of 25-45" and operates with pressures up to 350 bar and even more. The branched off pipelines are often 6-16" and operates with same pressures when they are set to work.

The T-pipe piece 1 is as before prepared for "hot tapping". This is done in that the traditional thick walled steel plate at the bottom of the branch pipe 1b from the T-pipe piece 1 now is replaced by a metal diaphragm (or membrane) 2, see FIG. 7. The metal diaphragm 2 is as before continuous with the goods in the T-pipe piece and creates a fluid barrier against the main passage 1a. However, the thickness of the metal diaphragm 2 is not sufficient to withstand the pressure within the T-pipe piece 1 during operation and would break open if remained alone. Accordingly not any adequate pressure barrier between the main passage 1a and the branch passage 1b. Therefore a supporting plug 3 is inserted into the branch passage 1b. The bottom of the support plug 3 is abutting the metal diaphragm 2 and thus provides necessary support to the plug in order to prevent the diaphragm to be blown out. Typical thickness of the diaphragm 2 will be 5-10 mm under those conditions introductorily described. Together the support plug 3 and the metal diaphragm 2 form an adequate fluid and pressure barrier against the environment. To improve the control when the branch pipe 1b is to be opened up for connection, the above described way to do it is suggested.

Moreover, the top of the T-pipe piece 1 is as before designed with a flange 4 and adapted to be able to make up a mechanical connection once in the future, by means of such a device as a clamp connector. In the meantime the connection point is protected by a cover or bonnet (not shown).

When the new T-pipe piece 1 is to be used a traditional valve module 15 is mounted to the top of the branch pipe 1b of the T-pipe piece as shown in FIG. 8, and entirely corresponding to what was described with regard to FIG. 2. As mentioned, the connection takes place by means of a mechanical connector (not shown) over the flange 4 and the lower flange 16 on the valve module 15. The top of the valve module 15 has an upper flange 17 and, in the same way as the T-pipe piece 1, is adapted to a mechanical connector.

As before, a tool assembly 5 is installed on top of the valve module 15 such as shown in FIG. 9 corresponding to what is shown in FIG. 3. The tool 5 is now modified and includes a retrieving tool 6 which is arranged to be able to retrieve the plug 3 and pick up the metal diaphragm 2 in one and the same operation. As before the tool 5 is mounted to the ball valve module 15 by means of another mechanical connector (not shown) acting over an upper flange 17 of the valve module 15 and a lower flange 7 of the tool assembly 5.

When a retrieving operation is to be performed, the ball valve 18 is firstly opened. The cavity 19 of the ball valve module 15 and the plug tool 5 is pressurized such that the pressure differential between the pipeline and the cavity 19 is balanced.

As shown in FIG. 10 the plug retrieving tool 6 is lowered through the ball valve 18 and establishes a mechanical connection with the plug 3. The mechanical connection can be a bayonet coupling, threads or snap acting connection means. The plug retrieving tool 6 is then retrieved, together with the plug 3 and metal diaphragm 2, which is torn loose from the T-pipe piece, preferably along a prefabricated nick. The rupture nick can be in the form of an outline mark or groove circumferentially arranged along the internal periphery of the branch pipe, at the inside towards the main passage 1a, alternatively on the outside pointing outwards from the branch pipe 1b.

When the plug retrieving tool 6, the plug 3 and the metal diaphragm 2 is parked in the tool 5, the ball valve 18 is closed. See FIG. 11. This isolates the pipeline from the environment. Then the complete plug tool 5 is disconnected from the valve module 15 and is retrieved to the surface. See FIG. 12. The T-pipe piece 1 is now ready for connection of a new branched off pipeline via the valve module 15.

FIG. 13 shows in closer detail an embodiment of the support plug 3. The support plug 3 includes a lower plug body 3a having a lower abutment surface 3f which supports the diaphragm 2 when the support plug 3 is installed in a branch pipe 1b. Further, the support plug 3 includes an upper plug body 3b, or a cap, which is spaced apart from, but connected via bolts 3g to the lower plug body 3a. An actuation ring 3c is located between the upper and lower plug body 3a and 3b, which ring 3c acts via a peripheral surface 3c' against an internal surface 3d' of a split ring 3d, or span ring, which is circumscribing the actuation ring 3c. This will be explained in more detail below and reference is also given to the FIGS. 15-17.

The support plug 3 is a composite part which is to be able to take care of several functions. Firstly, it needs to be able to be locked and form a support for the diaphragm 2 such that the diaphragm do not blow out and creates an opening in the branch pipe 1b of the T-pipe piece 1. The branch pipe 1b is designed with internal grooves, or flutes 1b', which are to engage with external grooves 3d", or flutes, on the split ring 3d arranged on the plug 3. The split ring 3d is activated to be radially expanded outwards by the actuation ring 3c by moving the ring 3c downwards. This takes place in that the peripheral surface 3c' is designed with cam surfaces that act against corresponding surfaces 3d' internally of the split ring 3d. The split ring 3d thus acts as a locking ring that retains the plug 3 in place in the branch pipe 1b.

Secondly, the support plug 3 needs to be able to be removed again once in the future in order to open up for flow through the branch pipe 1b. Then the actuation ring 3c must be elevated from the lower plug body 3a such that the split ring 3d is relieved and contracts and thus releases the engagement with the internal grooves of the branch pipe 1b. Then the plug can be pulled out.

In order to retrieve the plug 3 the tool 5 is installed onto the valve module 15, such as shown in FIG. 9 and in closer detail in FIG. 14 where the tool has brought with the plug 3 and a carried diaphragm part 2'. The tool 5 is now modified and includes a retrieving tool 6 which is arranged to be able to retrieve the plug 3 and the metal diaphragm 2 in one and the same operation. As before the tool 5 is installed by means of a mechanical connection (not shown) that acts over the upper flange 17 of the valve module 15 and a lower flange 7 on the tool 5.

FIG. 15 shows a possible embodiment of the diaphragm 2 before the plug is installed. A number of pin bolts 2a or similar are securely fastened and project from the metal diaphragm 2. The plug is installed over the pin bolts 2a and is secured by nuts 2b as shown in FIG. 16. However, the locking itself takes place with the split ring 3d described above. FIG. 17 shows a sequence subsequent that the plug 3 including the metal diaphragm 2 is torn loose and on its way up—omit illustrations of the tool. However, it is to be understood that the retrieving tool 5, 6 is used for this.

FIG. 18A shows an embodiment with tearing nicks B in the diaphragm 2 and where this is illustrated in closer detail in FIG. 18B. Those parts, components or modules which are similar to those in FIGS. 7-12, have the same reference numbers. The metal diaphragm 2 is as before continuous with the goods of the T-pipe piece 1 and creates a fluid barrier against the main passage 1a. However, the metal diaphragm 2 now has a tearing nick/rupture nick B which extends in a circle adjacent to the internal wall of the branch pipe 1b. The bottom of the supporting plug 3 is as before abutting the metal diaphragm 2 and thus provides required support for the diaphragm in order to prevent the diaphragm from being ruptured. Typical thickness of the diaphragm 2 will be 5-10 mm under those conditions introductorily described. Together the support plug 3 and the metal diaphragm 2 form an adequate fluid and pressure barrier against the environment. To improve the control when the branch pipe 1b is to be opened up for connection, the way to do it, as above described, is suggested. The tearing nick can be arranged from both sides, or from one of the sides only. Here both sides are shown. The further "hot tapping" procedure is as previously described with reference to the FIGS. 7-12, but the tear off of the metal diaphragm 2' will take place in a still more controlled way.

The invention claimed is:

1. A T-pipe piece (1) designed for transfer of fluids under high pressure through a main passage (1a) thereof, a branch pipe (1b) remains in standby use position, said T-pipe piece comprising:

said branch pipe (1b) having an opening being sealed by a material which is continuous with the main passage (1a)

and having a seal, and when required, forming an opening and fluid flow in the branch pipe (1b) while the main passage (1a) is in production and remains under full pressure; and the seal includes a metal diaphragm (2) which remains in contact with the fluid flowing in the main passage (1a), which metal diaphragm (2) being thinner than a wall thickness of the T-pipe piece and being, in use, supported by a solid body of a plug (3) inserted in the branch pipe.

2. The T-pipe piece as defined in claim 1, the metal diaphragm (2) has a thickness approximately from 1/20 to 1/2 of the wall thickness of the T-pipe piece (1).

3. The T-pipe piece as defined in claim 1, the metal diaphragm (2) includes a rupture nicking (B) which is activated when the plug (3) is pulled out.

4. The T-pipe piece as defined in claim 1, the metal diaphragm (2) is connected to the plug (3) and is pulled therewith when the plug (3) is pulled out.

5. The T-pipe piece as defined in claim 1, the plug (3) includes internal activating mechanism which can be manipulated by a tool to retain, alternatively release, the plug (3) from the branch pipe (1b).

6. The T-pipe piece as defined in claim 5, the activating mechanism includes a conical mandrel body able to expand a locking ring.

7. A tool (5) for opening up of said branch pipe of said T-pipe piece as defined in claim 1, opening up of the branch pipe taking place under complete control during full production pressure and fluid flow, the tool being used together with a valve assembly which is being first installed in a sealed way to the branch pipe, the tool includes a connection means in a lower end thereof for engagement with the plug.

8. A method for controlled opening of a branch pipe of a T-pipe piece which transfers fluid under pressure through a main passage thereof, where the branch pipe is sealed off in its opening by a material that is continuous with the main passage and has, until opening thereof, remained in standby position for possible future use, where an opening and fluid flow in the branch pipe is created while the main passage is under production and remains under full pressure, and a seal comprises a thin metal diaphragm which is in contact with the fluid flowing through the main passage and the diaphragm is supported by a plug inserted in the branch pipe, said method comprising the following steps:

mounting a valve assembly to the branch pipe;

installing a tool assembly onto the valve assembly, a valve being opened and a cavity of the valve pressurized such that pressure differential between the pipe and said cavity is balanced;

lowering a plug retrieving tool through the valve assembly and establishing a mechanical connection with the plug;

retrieving the plug tool together with the plug and metal diaphragm as the metal diaphragm is torn loose from the T-pipe piece, the plug tool, the plug and the diaphragm being parked within the tool assembly;

closing the valve and isolating the pipe from environments; and disconnecting the tool assembly from the valve assembly and removing the tool assembly, said T-pipe piece now stands ready for connection of a pipeline.

9. The method as defined in claim 8, the metal diaphragm is torn loose from the T-pipe piece along a prefabricated nick.

* * * * *